Aug. 9, 1932.    H. H. BRAY    1,870,890
NOZZLE OR END FOR PUSH TYPE GREASE GUNS
Filed March 31, 1930
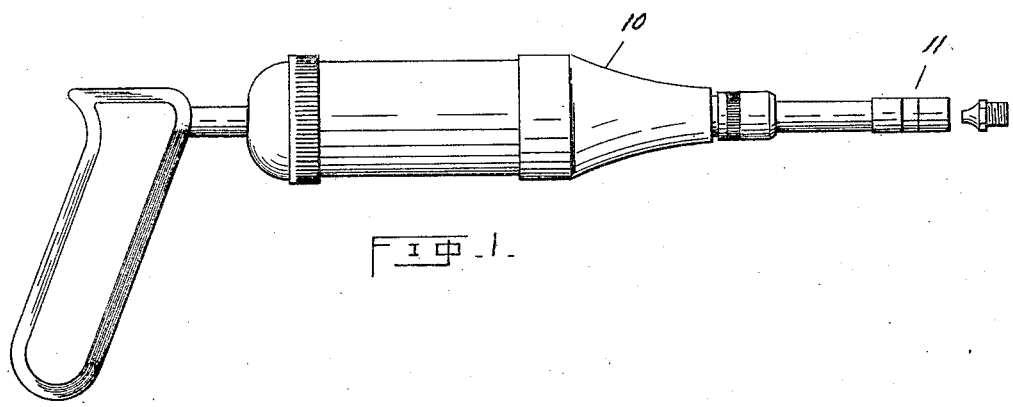
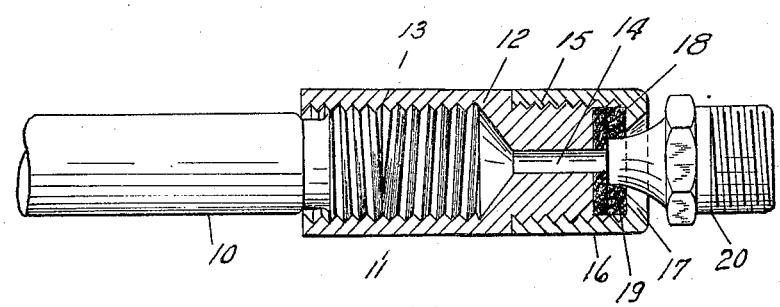
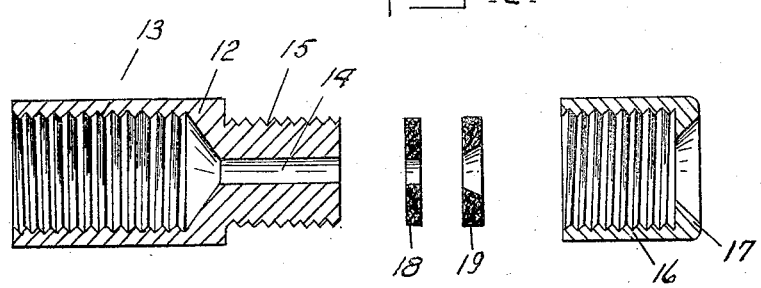
INVENTOR
Roy H. Bray.
BY
Ely & Barrow
ATTORNEYS Patented Aug. 9, 1932

1,870,890

UNITED STATES PATENT OFFICE

HOY H. BRAY, OF CUYAHOGA FALLS, OHIO

NOZZLE OR END FOR PUSH TYPE GREASE GUNS

Application filed March 31, 1930. Serial No. 440,303.

This invention relates to nozzles or ends for push type grease guns or grease pressure supply lines.

The general purpose of the invention is to provide an improved nozzle or end for grease guns or supply lines of that type which requires pushing of the nozzle against a fitting on the device to be greased, and more particularly the invention has for its chief objects the provisions of a nozzle of this type including resilient washer means adapted to be pressed against the mouth of the fitting effectively to seal against the same and means retaining the washer means in place in the nozzle or end, said means being removable so that the washer means are replaceable when worn.

The foregoing and other purposes or objects of the invention are attained in the nozzle or end shown in the accompanying drawing and described below. It is to be understood that the invention is not limited to the specific form thereof shown and described.

Of the accompanying drawing,

Figure 1 is a side elevation of a grease gun having a nozzle or end embodying the invention thereof shown as about to be pushed against a grease fitting;

Figure 2 is a longitudinal section through the nozzle or end shown in operative relation with a grease fitting; and Figure 3 is a longitudinal section through the nozzle or end parts separately, the parts being aligned so as to show the arrangement of the parts in assembling.

Referring to the drawing, the numeral 10 designates a grease gun which may be any one of the well-known push type guns and which has a nozzle or end 11 thereon embodying the present invention. The nozzle or end 11 may be mounted on a grease supply line to which grease may be forced in any suitable way.

The nozzle or end 11 comprises a sleeve 12 formed with a bore of such size at 13 as to be received and secured on the end of gun 10 or the like as by threading thereon as shown, the bore of sleeve 12 being reduced at its outer end to provide an outlet or duct 14 through which a stream of grease may be forced under comparatively high pressure.

The sleeve 12 is exteriorly formed at 15 to receive a second sleeve 16 which is adapted to be removably secured on the outer end of sleeve 12 as by threading it on sleeve 12 as shown. Sleeve 16 is formed with a retaining flange 17 extending radially inwardly at the outer end thereof.

Sleeve 16 is designed to removably secure resilient gasket or washer means in place in the nozzle. This means preferably comprises two separate washers 18 and 19 of long-wearing, grease-resisting, resilient material such as leather, chrome leather being preferred. Washer 18 preferably is formed with a central opening coinciding with outlet or duct 14 and washer 19 preferably has a larger opening formed with a conical wall, the larger end being toward the outer end of the nozzle. The washer 19 is preferably of greater thickness than washer 18 to provide a comparatively greater area of sealing on the side of a fitting. Washers 18 and 19 are preferably of such size as to be force-fitted in the sleeve 16 and when mounted in place are compressed between the outer end of sleeve 12 and the inner side of flange 17.

It will be seen upon inspection of Figure 2 that when the improved nozzle or end is pressed against a fitting 20, the end of the fitting bears against the face of washer 18 about its central opening and the wall of the central opening of gasket 19 is compressed more or less about the periphery of the fitting to aid in maintaining a seal between the gun and fitting when grease is being supplied to the fitting.

It has been found that this washer construction wears longer because it is not cut up by the edge of the fitting and when worn out the washers, of course, are easily replaceable. Modifications of the invention obviously may be resorted to without departing from the spirit thereof or the scope of the appended claims.

What is claimed is:—

1. A nozzle or end for push type grease guns comprising a sleeve formed with a bore providing an outlet for the grease, a second sleeve adapted to be removably secured on said first sleeve and having a radial inwardly directed flange on its outer end, and a pair of resilient, grease-proof washers clamped between the end of said first sleeve and said flange, the washer adjacent the outer end of said first sleeve having a central opening substantially coinciding with said outlet and the washer adjacent said flange having a larger conical opening exposing a portion of the face of the first-named washer to press against a grease fitting, the larger side of the opening in the second washer being outwardly of the nozzle whereby said second-named washer is adapted to fit about the periphery of a grease fitting and to be radially compressed thereby.

2. A nozzle or end for push type grease guns comprising a sleeve formed with a bore providing an outlet for the grease, a second sleeve adapted to be removably secured on said first sleeve and having a radial inwardly directed flange on its outer end, and a pair of resilient, grease-proof washers clamped between the end of said first sleeve and said flange, the washer adjacent the outer end of said first sleeve having a central opening substantially coinciding with said outlet and the washer adjacent said flange having a larger opening exposing a portion of the face of the first-named washer to press against a grease fitting, said last-named washer being adapted to be radially compressed by said fitting.

3. A nozzle or end for push type grease guns including a sleeve formed with a bore having a grease duct therein, a second sleeve adapted to be removably secured on said first sleeve and having an inwardly extending flange at its outer end, gasket means retained in said end by said flange including an inner portion presenting a flat face for contact with the end of a grease fitting, and an outer portion having a conical opening therethrough about said flat face adapted to be compressed against the sides of a grease fitting.

HOY H. BRAY.